United States Patent [19]

Tabor

[11] Patent Number: 4,655,911
[45] Date of Patent: Apr. 7, 1987

[54] LIQUID FILTER WITH REVERSE FLOW RINSING OPERATION

[75] Inventor: Elhanan Tabor, Carmiel, Israel

[73] Assignee: AR-KAL Plastics Products Beit Zera (1973), Israel

[21] Appl. No.: 848,312

[22] Filed: Apr. 4, 1986

[30] Foreign Application Priority Data

Nov. 3, 1985 [IL] Israel ............................. 76917

[51] Int. Cl.⁴ ............................................. B01D 29/02
[52] U.S. Cl. .................................... 210/107; 210/354; 210/393
[58] Field of Search ............... 210/107, 108, 355, 411, 210/412, 393, 354

[56] References Cited

U.S. PATENT DOCUMENTS 3,081,876  3/1963  Bizard ............................... 210/354
4,271,018  6/1981  Drori ................................. 210/107
4,308,142 12/1981  Brackmann et al. ............... 210/355

Primary Examiner—John Adee
Attorney, Agent, or Firm—Ostrolenk, Faber, Gerb & Soffen

[57] ABSTRACT

A filter device is disclosed in which the filter element is made to spin about itself during reverse-flow, flushing operational stage thereof. The device comprises a sprinkle member rotatably supported inside the filter element. Reaction forces generated by water jets forced through the sprinkle member cause its rotation, and the filter element is then caused to rotate by the jets sprayed against its inner surface. In a preferred embodiment disclosed, the filter is of the disc-type, provided with a hydraulic cylinder adapted to release the compact engagement of the disc. The discs become separated from each other, each disc being imparted the rotational movement of the rotating jets.

10 Claims, 4 Drawing Figures

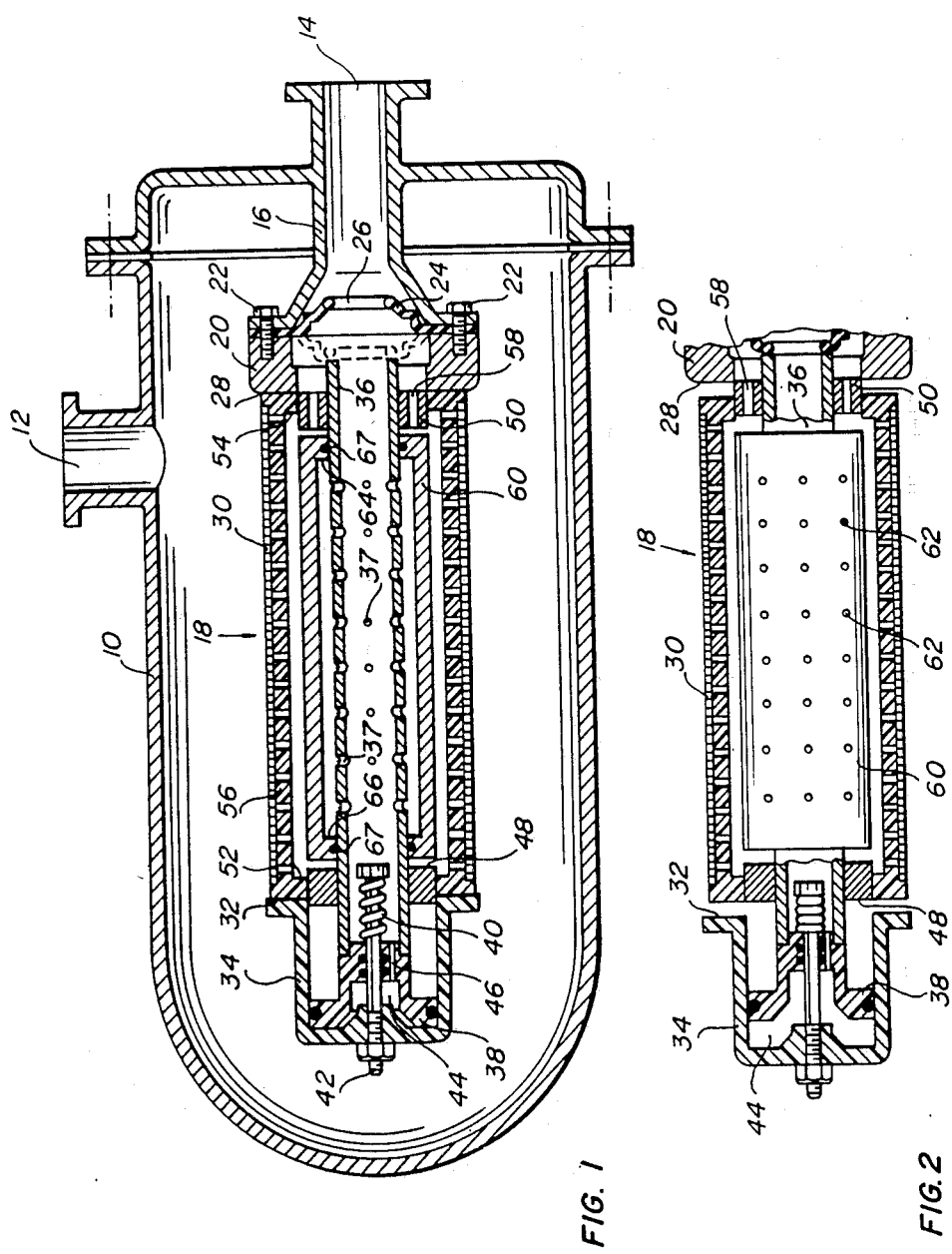

LIQUID FILTER WITH REVERSE FLOW RINSING OPERATION

BACKGROUND OF THE INVENTION

The present invention relates to liquid filters, and more particularly to filters used in water irrigation installations. The invention more specifically concerns water filter systems which comprise a filtering member or body of various types included in a filtering device, which device also comprise means for periodically effecting reverse water flow rinsing stages, e.g. of the type described in our co-pending patent application No. 848,308 filed 4/4/86. As therein described in more detail, these filter devices incorporate two main characteristic features, namely that there has been provided hydraulically operated clamping means which, upon reverse, flushing flow operation, were adapted to release a grip on the filter member; and, that water jets sprayed at an angle with respect to the radial, became operative to spin the filter member either as a whole, in the case of a unitary, screen-type filter, or any and all of its individual, roughened surface discs constituting the filter member—in the case of disc filters.

While in the former above-mentioned filter construction the water jets were ejected from elongated, pierced fixed ribs, it has been now found that the construction can be made more simple and staightforward by utilizing the so-called reaction-wheel principle, as applied e.g. to rotary sprinklers. Through the introduction of such improvement into the known filter devices, a more simple construction results with universal applications, involving less costs in the manufacture of precision parts and components, and the assembly thereof.

SUMMARY OF THE INVENTION

Accordingly, the invention provides for a liquid filtering device, particularly for water irrigation installations, which comprises a housing with inlet and outlet ports, and a filter assembly including a filter member of a hollow elongated cylindrical configuration. The filter member is adapted to spin about a support member during reverse, flushing liquid flow from the outlet to the inlet of the housing. A rotatable sprinkler member is provided in the annular space between the outer surface of the support member and the inner surface of the filter member. Valve means are provided for feeding the liquid from the outlet to the sprinkle member, causing the latter to rotate and spray liquid jets therearound against the inner surface of the filter member.

The sprinkler member may be constituted by a tubular member having a wall with a plurality of throughgoing, tangentially oriented orifices. The member is rotatably mounted at its two ends on a centrally-extending apertured pipe, of which one open end communicates with the housing outlet for feeding the liquid to the said sprinkler member. The rotated filter member may be a unitary body such as of the perforated sheet metal sleeve type, or of the multiple-discs type.

BRIEF DESCRIPTION OF THE DRAWINGS

Two main preferred embodiments of the invention are hereinbelow described in greater detail to make the invention more fully understood and without limiting its scope, with reference to the accompanying drawings, wherein:

FIG. 1 is a longitudinal cross-section of a housing incorporating a filter device according to a first embodiment of the invention;

FIG. 2 partially shows the device of FIG. 1 in a reverse flow, flushing mode of operation;

DETAILD DESCRIPTION OF THE PREFERRED EMBODIMENTS

Figure 3:
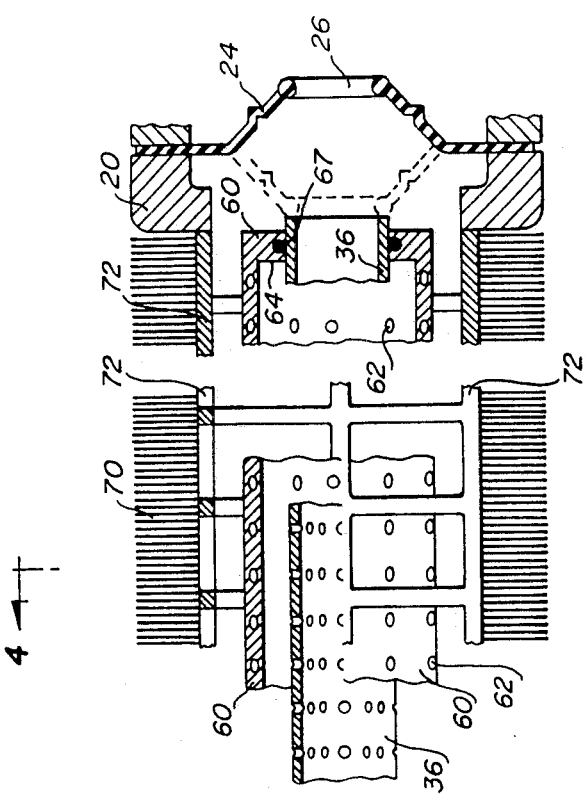
FIG. 3 is a fragmental cross-sectional view of a second embodiment of the invention.

The filter device of FIG. 1 comprises a conventionally shaped outer housing 10 with water inlet port 12 and outlet port 14. Mounted on an extension portion 16 of the outlet port 14 is a filter essembly generally designated 18, which comprises a mounting flange 20 connected to the portion 16 by bolts 22 with a flexible diaphragm 24 clamped therebetween as shown.

The diaphragm 24 is annular, with an opening 26 defined at its center, and is adapted to flex between a normal, open position and a reversed-flow, flushing position as shown in dashed lines.

Side wall 28 of the flange 20 constitutes a fixed surface, against which abuts a filter member 30—in the described example being of the metal screen type—whereas at its other side it is pressed by flange 32 of a hydraulic cylinder member 34 (if provided—see below).

There is further provided a centrally-extending pipe 36 with apertures 37 spread throughout its wall. One, open end of the pipe 36 is located opposite the opening 26 of the diaphragm 24, and at its other end, a fixed piston member 38 is carried, co-operating with the inner surface of the cylinder 34. Compression spring 40 with a bolt arrangement 42 causes the cylinder to be always pulled against the piston 38 and against the filter member 30. Hydraulic chamber 44 of the piston-cylinder assembly communicates with the interior of the pipe 36 through a vent 46.

There are further provided a pair of support rings 48 and 50 at the two sides of the pipe 36, which rings slidingly support the two inwardly directed flanges 52 and 54 of inner plastic backing sleeve 56 usually contained within the perforated sheet metal filter 30. Obviously, the righthand side ring 50 is provided with numerous passages 58 to allow the water from the inlet 12, and filtered by the filter 30, to flow through the annulus 26 of the diaphragm 24 and to the outlet 14 during normal filtering operation of the device.

Figure 4:
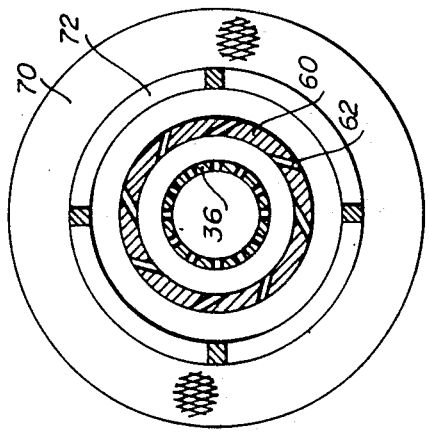
FIG. 4 is a section taken along line 4—4 of FIG. 3.

Now, according to the characteristic feature of the present invention, there is rotatably mounted on the pipe 36 a reaction wheel or sprinkler member which is shown in the described example as an elongated tubular member 60, provided throughout its wall with a plurality of jets producing orifices 62 which are oriented in a more-or-less tangential direction (see FIG. 4). However, the same jets reaction effect can be achieved by other means such as a series of individual, miniature rotatable sprinklers of conventional design and operation.

The sprinkler member 60 is mounted in a freely rotatable manner by any suitable means such as inwardly directed flanges 64 and 66, possibly provided with "O" rings 67, for facilitating smooth and frictionless rotation of the sprinkler member 60 about the outside surface of the pipe 36, once water flow impact is applied through the tangential orifices 62.

As already known from the previously mentioned corresponding devices, in operation of the filter device, liquid will flow from the inlet 12, become filtered by the filter 30, and discharged through the outlet 14. Now, should the flow direction be reversed, the liquid under pressure will first force the diaphragm 24 to flex to the left and close the normal filtering-flow passage through openings 58 and around the pipe 36, compelling the water first to fill the pipe 36, and then to become discharged through the openings 37 and start the sprinkling or spaying operation of the member 60. Water discharged through the tilted orifices 62 of the revolving sprinkler member 60 will start to rotate same in the direction opposite to the tangential orienation of the orifices 62. It should be emphasised at this point that in the case of unitary, rigid filtering members such as the metal or plastic screens, or wedge-wire filters, there is no need for any additional means to achieve effective cleaning thereof in the manner heretofore described; the filter member may stay fixed at its place and the revolving jets impinging against its inside surface time and again will do the job satisfatorily. It is only for the sake of completion and universality that the provision of the hydraulic displaceable cylinder 34 and associated operating assembly are shown in the instant example, rendering the device as such be used with disc-type filters—as will be explained in more detail with reference to FIGS. 3 and 4. Thus, in the event that the hydraulic system is initially made part of the filter device (and/or not disabled by any means which can be easily provided)—as in the case of FIGS. 1 and 2—besides the inside-out rotating jets rinsing operation, water will also be forced under presseure to fill the chamber 38 and displace the cylinder 34 to the left into the position shown in FIG. 2. The filter 30, being no longer clamped between the surfaces 28 and 32, will eventually followsuit and will start to rotate about the rings 48 and 50 under the impact of the water jets.

In the fixed, as-well-as in the rotatable modes of performance, the rinsing of the filter 30 is achieved in an effective manner, notwithstanding the fact that the water jets emerge from a rotary—rather than a stationary—feeding source, namely the sprinkler member 60 on the one hand, and the fixed pierced ribs as in our previously-mentioned patent application—on the other hand.

The embodiment illustrated in FIGS. 3 and 4, in which the same reference numerals have been used to denote corresponding parts and components of the former embodiment, differs in that it refers not to a unitary filter member—be it of the sheet metal screen type or any other known, unitary body filter type—but to the pack-of-discs type of filters. Hence, such discs are denoted 70 and are supported in side-by-side juxtaposition on a cylinderical, cage-like structural member 72. It will be now readily understood that once the compacting force on the pack of discs 70 by the cylinder 34 (not shown) is relieved, and every disc become individually free to spin about the support cage member 72, the water jets from the sprinkler member 60 will achieve the same result, namely the effective rinsing of the discs during spinning thereof, in a fashion similar to that disclosed in our above-mentioned patent application.

To summarise, the invention proposes a filter device with reverse-flow, spin flushing facilities, which is univesrsal in the sence that all common types of filter media are applicable with respect therto, i.e. the same device may be charged with a screen-type, one-piece filter element or with a disc-type filter element, at will, while flushing is effected by the rotary sprinkle member operated by the reverse liquid flow.

Evidently, there may be further applied numerous other modifications and alternative operating means as disclosed in our said co-pending application, e.g. different valve means that may replace the diaphragm type of valve above described, as well as different structures and controls of the piston and cylinder assembly—if in fact incorporated in the device.

Various other changes, modifications and variations will be readily appreciated by those skilled in the art to which this invention pertains, which should be deemed to fall within the scope of the invention as defined in and by the appended claims.

What is claimed is:

1. A liquid filtering device, particularly for water irrigation installations, comprising a housing with inlet and outlet ports, a filter assembly within the housing, which comprises a filter member of a hollow elongated cylindrical configuration and a support member about which the filter member is adapted to spin during reverse, flushing liquid flow from the outlet to the inlet of the housing, characterized by a rotatable sprinkler member provided in an annular space between the outer surface of the support member and the inner surface of the filter member, and by valve means for feeding the liquid from the outlet to the sprinkle member, causing the latter to rotate and spray liquid jets therearound against the said inner surface of the filter member.

2. The device as claimed in claim 1, wherein the rotatable sprinkler member comprises a tubular member having a wall with a plurality of throughgoing, tangentially oriented orifices.

3. The device as claimed in claim 2, wherein the tubular member is rotatably mounted at its two ends on a centrally-extending opertured pipe, one open end of which communicating with the housing outlet via the valve means for feeding the liquid to the sprinkler member during the reverse flow.

4. The device as claimed in claim 3, wherein the hydraulic means comprises a fixed piston member mounted at the other end of the pipe, slidably supporting a reciprocating cylinder.

5. The device as claimed in claim 4 further comprising hydraulic operated clamping means normally holding the filter member against rotational movement and releasing same by the reverse flow to allow the free rotation of the filter member by the water jets.

6. The device as claimed in claim 5, wherein the valve means is automatically responsive to the flow direction for allowing the flow of liquid into the said cylinder when the direction thereof is reversed.

7. The device as claimed in claim 6, wherein the valve means comprises and annular, springy diaphragm adapted to flex between a first position wherein liquid is directed from the inlet through the filter member and along the sprinkler member to the housing outlet, and a second position wherein liquid is directed from the outlet into the said one end of the pipe.

8. The device as claimed in claim 1, wherein the filter member is of the metal or plastic screen, or wire-wedge types.

9. The device as claimed in claim 7, wherein the filter member comprises a pack of discs with roughened surfaces in side by side compact juxtaposition.

10. The device as claimed in claim 9, wherein the discs are supported on a cage-like cylindrical member enveloping the sprinkler member.

* * * * *